US012762285B2

(12) United States Patent
Jalil et al.

(10) Patent No.: US 12,762,285 B2
(45) Date of Patent: Oct. 13, 2026

(54) SYSTEM AND METHOD TO ANALYSE IMPACT OF DATA BREACHES ON SENSITIVE DATA

(71) Applicant: Securiti, LLC, Kirkland, CA (US)

(72) Inventors: Rehan Jalil, Portola Valley, CA (US); Michael Busha, Menlo Park, CA (US); Michael Rinehart, Pleasanton, CA (US)

(73) Assignee: Securiti, LLC, Kirkland, WA (US)

(*) Notice: Subject to any disclaimer, the term of this patent is extended or adjusted under 35 U.S.C. 154(b) by 109 days.

(21) Appl. No.: 18/820,426

(22) Filed: Aug. 30, 2024

(65) Prior Publication Data

US 2025/0077714 A1 Mar. 6, 2025

Related U.S. Application Data

(60) Provisional application No. 63/580,245, filed on Sep. 1, 2023.

(51) Int. Cl.

| | |
|---|---|
| ***H04L 9/00*** | (2022.01) |
| ***G06F 21/60*** | (2013.01) |
| ***G06F 21/64*** | (2013.01) |
| ***G06N 3/0475*** | (2023.01) |

(52) U.S. Cl.

CPC ............ *G06F 21/64* (2013.01); *G06F 21/604* (2013.01); *G06N 3/0475* (2023.01)

(58) Field of Classification Search

None

See application file for complete search history.

(56) References Cited

U.S. PATENT DOCUMENTS

| | | | | |
|---|---|---|---|---|
| 10,771,347 | B2 | 9/2020 | Balabine | |
| 11,750,625 | B1 | 9/2023 | Sharma et al. | |
| 11,921,686 | B1 | 3/2024 | Leena Mary Francis et al. | |
| 2020/0021496 | A1* | 1/2020 | Balabine | H04L 41/145 |
| 2023/0246561 | A1* | 8/2023 | Kawashima | H02M 1/38 318/504 |
| 2023/0370495 | A1* | 11/2023 | Desai | H04L 63/1425 |
| 2023/0396641 | A1* | 12/2023 | Hebbagodi | H04L 63/1408 |
| 2024/0045990 | A1* | 2/2024 | Boyer | G06F 21/6245 |

* cited by examiner

*Primary Examiner* — Christopher J Brown

(74) *Attorney, Agent, or Firm* — Sterne, Kessler, Goldstein & Fox P.L.L.C.

(57) ABSTRACT

A system to analyse impact of data breaches on sensitive data is disclosed. The system includes a hardware processor and memory with program instructions for executing various modules. The data collection module retrieves and enriches impacted data from multiple repositories. The data identification module uses data loss prevention (DLP) and named entity recognition (NER) techniques, enhanced by large language models (LLMs), to accurately identify personal information. The identity deduplication module consolidates individual references using deterministic and probabilistic techniques, while the residency inference module applies machine learning and heuristic methods to determine residency based on various data sources. The analysis module assesses impacted data to identify relevant laws and estimate fines. The automation module streamlines response actions, including generating notifications and ensuring compliance. This system enhances breach response efficiency through integrated, automated analysis and actions.

17 Claims, 3 Drawing Sheets

SYSTEM AND METHOD TO ANALYSE IMPACT OF DATA BREACHES ON SENSITIVE DATA

EARLIEST PRIORITY DATE

This application claims priority from a Provisional patent application filed in the United States of America having Patent Application No. 63/580,245, filed on Sep. 1, 2023, and titled "BREACH IMPACT ANALYSIS".

FIELD OF INVENTION

Embodiments of the present disclosure relate to the field of data security and privacy management, and more particularly to, a system and a method to analyse impact of data breaches on sensitive data, automating legal compliance, and optimizing breach response using advanced data processing and machine learning techniques.

BACKGROUND

In today's digital age, organizations increasingly rely on vast amounts of sensitive data, making data security a critical concern. Conventional systems for managing data breaches are often manual, fragmented, and reactive. These systems typically require significant human intervention to identify the scope of a breach, determine the affected individuals, and comply with legal obligations. Traditional data breach management processes involve manually sifting through large volumes of data to identify personal information, which is both time-consuming and error-prone.

Moreover, existing systems often struggle with accurately identifying and deduplicating personal information across multiple datasets, leading to either missed detections or redundant efforts in notifying impacted individuals. Conventional identity deduplication methods lack the sophistication to resolve ambiguities in data, resulting in either false positives or missed correlations. This inadequacy is further exacerbated by the challenges in inferring the residency of affected individuals, which is crucial for determining applicable laws and potential fines. The absence of advanced residency inference mechanisms in traditional systems limits their ability to accurately assess the geographical impact of a breach.

Legal compliance is another significant challenge for conventional systems. The process of identifying relevant laws and calculating potential fines is typically handled manually, requiring extensive legal expertise and time. The manual nature of this process increases the risk of non-compliance with various jurisdictional regulations, which can lead to severe financial penalties and reputational damage. Additionally, existing systems lack the capability to automate responses effectively, resulting in delays in notifying regulatory bodies and impacted individuals, which further complicates legal compliance.

In summary, conventional data breach management systems are plagued by inefficiencies, inaccuracies, and a lack of automation. These limitations hinder organizations from responding swiftly and effectively to data breaches, leaving them vulnerable to legal penalties, financial losses, and reputational harm. The need for a comprehensive, automated solution that can accurately analyse the impact of data breaches, identify relevant legal obligations, estimate potential fines, and streamline the response process is more pressing than ever.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
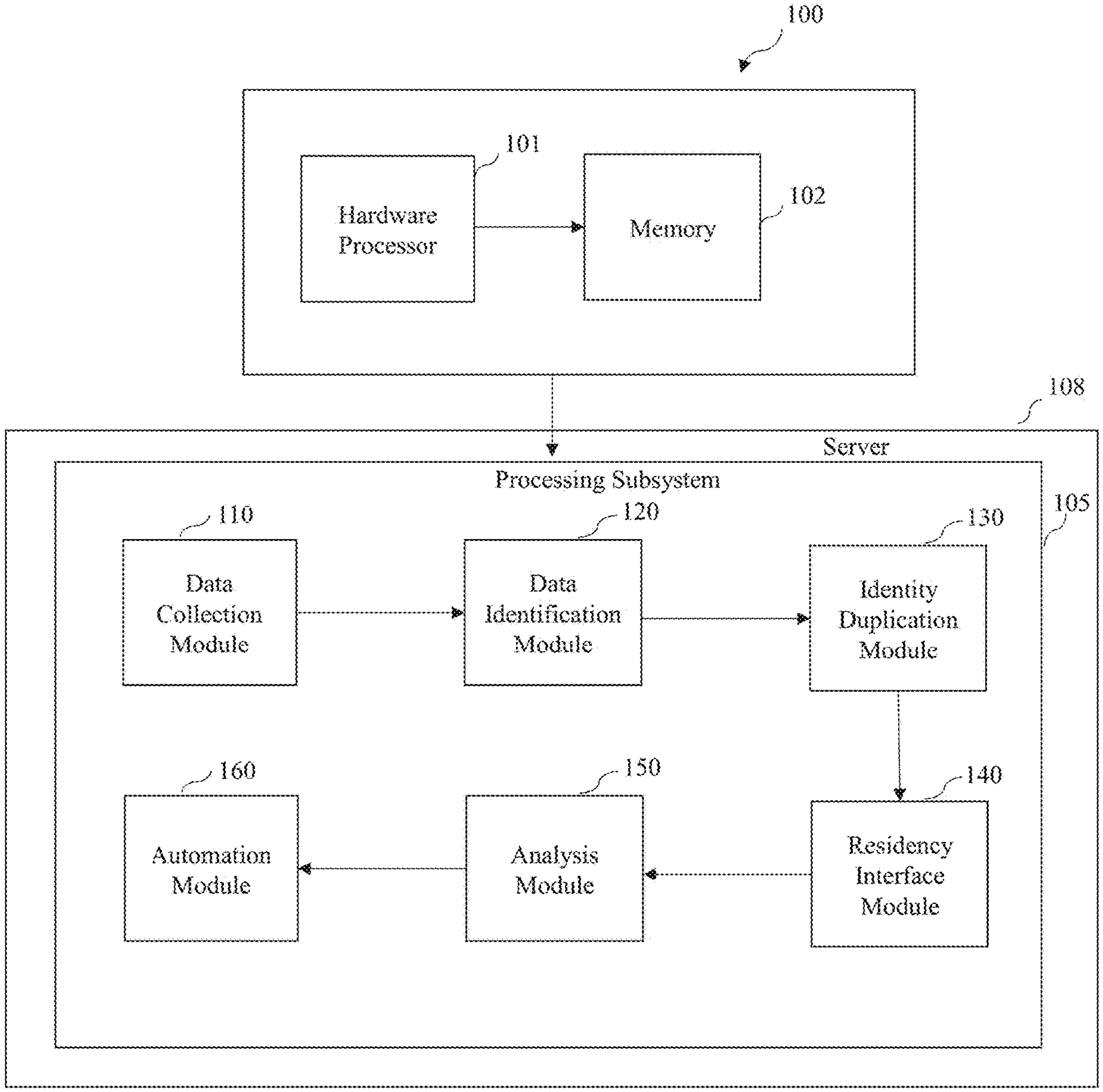
FIG. 1 is a block diagram of a system to analyse impact of data breaches on sensitive data in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to the field of data security and privacy management, and more particularly to, a system and a method to analyse impact of data breaches on sensitive data, automating legal compliance, and optimizing breach response using advanced data processing and machine learning techniques.

The present invention pertains to an advanced Breach Impact Analysis (BIA) system 100 that automates the process of assessing and responding to data breaches. The system is designed to efficiently analyse impacted data sources, identify sensitive personal information, and deduplicate identities across multiple datasets. It further determines the residency of affected individuals to ascertain applicable legal obligations and estimate potential fines. The invention integrates various technical modules, including data collection, identification, identity deduplication, residency inference, legal analysis, and automated response. These modules work together to deliver a comprehensive and accurate analysis of a data breach's impact, automating tasks that are traditionally manual and prone to errors. The BIA system employs cutting-edge technologies such as large language models, probabilistic linking, and AI-driven communication generation, ensuring that organizations can quickly and effectively respond to breaches while maintaining compliance with legal requirements. By addressing the limitations of conventional data breach management systems, the invention provides a robust solution that enhances the speed, accuracy, and legal compliance of breach responses, significantly reducing the risk of penalties and reputational damage.

FIG. 1 is a block diagram of a system to analyse impact of data breaches on sensitive data in accordance with an embodiment of the present disclosure. The system 100 includes a hardware processor 101 and a memory 102 coupled to the hardware processor 101. The memory 102 includes a set of program instructions in the form of a processing subsystem 105 and configured to be executed by the hardware processor 101. As used herein, the hardware processor performs data processing, decision making, and all general computing tasks and coordinates tasks done by memory, disk storage, and other system components. The processing subsystem 105 is hosted on a sever 108. In one embodiment, the server 108 may include a cloud server. In another embodiment, the server 108 may include a local server. The processing subsystem 105 is configured to execute on a network (not shown in FIG. 1) to control bidirectional communications among a plurality of modules. In one embodiment, the network may include a wired network such as local area network (LAN). In another embodiment, the network may include a wireless network such as Wi-Fi, Bluetooth, Zigbee, near field communication (NFC), infra-red communication (RFID) or the like.

The processing subsystem 105 includes a data collection module 110 configured to retrieve impacted data sources, including structured and unstructured data, upon interfacing with various data repositories and breach detection subsystems. The data collection module 110 is also configured to enrich the impacted data with additional contextual information for subsequent analysis upon integrating with customer or employee databases.

The data collection module 110 is a critical component of a breach impact analysis (BIA) system 100, responsible for the efficient retrieval, processing, and enrichment of impacted data sources upon the detection of a data breach. This module is designed to ensure that the data provided for subsequent analysis is comprehensive, normalized, and enriched, thereby optimizing the accuracy and effectiveness of the entire BIA process.

In terms of hardware configuration, the module includes a data interface subsystem that interfaces with various data repositories, such as internal databases, cloud storage systems, and external third-party sources. This subsystem utilizes API calls, database queries, and secure file transfer protocols (SFTP) to retrieve impacted data. Once the data is retrieved, the data ingestion engine takes over, responsible for the real-time ingestion of data. This engine ensures that data is pre-processed, structured, and stored in a format suitable for further analysis, supporting multiple data formats, including structured, semi-structured, and unstructured data.

On the software side, the data collection module 110 features a normalization and enrichment engine, where the collected data undergoes normalization, converting it into a consistent format. Following normalization, the data is enriched with additional contextual information sourced from customer databases, employee records, or other relevant datasets. This enrichment process significantly enhances the accuracy of identity deduplication and residency inference processes in subsequent modules. The data repository manager plays a vital role in securely storing and organizing the collected and enriched data, ensuring it is indexed and readily accessible to other modules within the BIA system. This manager supports distributed storage systems, allowing for scalability and compliance with data sovereignty regulations. Additionally, the real-time data synchronization engine continuously synchronizes the impacted data with real-time updates from connected repositories, ensuring that any changes or additions to the data are promptly reflected in the analysis process.

The data collection module 110 interfaces with multiple data sources, including internal databases, cloud storage solutions, and external data providers. It efficiently retrieves impacted data related to the breach event, such as personal information, transaction records, and other relevant datasets. Once the data is collected, it undergoes an enrichment process where additional contextual information is integrated, enhancing the data's utility for subsequent analysis. The enrichment process is crucial for improving the accuracy of downstream tasks, such as identity deduplication and residency inference, and may incorporate external data sources, like third-party demographic or geolocation data, to further refine the information.

Equipped with real-time data processing capabilities, the module 110 ensures that the most up-to-date information is available for analysis. This feature is especially critical in scenarios where breach events are ongoing or where data is continuously being updated or added to the impacted sources. The normalization process within the module involves converting data from various formats into a unified structure, facilitating easier analysis and comparison across different sources. This process addresses inconsistencies, duplicates, and formatting variations to ensure data integrity and reliability, and also standardizes fields such as names, addresses, and other identifiers, making it easier to cross-reference data from multiple sources during the analysis phase.

Throughout the data collection and processing stages, the data collection module 110 adheres to stringent data security protocols, including encryption and access controls, to protect sensitive information. It also ensures compliance with regional data sovereignty laws by employing region-specific data handling protocols. The module is designed to work in compliance with GDPR, CCPA, and other privacy regulations, ensuring that the data collected is handled and processed in accordance with legal requirements. This comprehensive approach to data collection and processing positions the data collection module 110 as a foundational element in the BIA system, ensuring accurate and efficient data analysis following a breach event.

Further, the processing subsystem 105 includes a data identification module 120 configured to scan files for personal information linked to individuals using a combination of data loss prevention (DLP) techniques and named entity recognition (NER) techniques. The data identification module 120 is also configured enhance detection accuracy by filtering false positives, identifying missed detections, and resolving ambiguities in data classification upon utilizing generative large language models (LLMs).

The data identification module 120 in the breach impact analysis (BIA) system 100 is designed to accurately detect and classify personal information within data impacted by a breach. It operates by first interfacing with the data collection module (110) to access enriched and normalized data. The data identification module 120 utilizes a combination of data loss prevention (DLP) techniques and named entity recognition (NER) to scan and identify both structured and unstructured personal data.

DLP techniques handle structured data, such as credit card numbers and social security numbers, using pattern matching and content inspection. The NER engine is responsible for detecting unstructured personal information, like names and addresses, within text-based data. This process is enhanced by integrating generative large language models (LLMs), which refine detection accuracy by reducing false positives, identifying missed detections, and resolving ambiguities in data classification.

The data identification module 120 also includes several advanced subsystems, such as the false positive filtering subsystem and the missed detection identifier. These subsystems enhance the reliability of the detection process by filtering out incorrect detections and identifying any information that might have been overlooked during initial scans. The ambiguity resolution engine addresses cases where data ambiguity exists, using probabilistic models to assign confidence scores and enable manual review when necessary.

The data identification module 120 supports parallel processing using distributed computing frameworks, making it capable of handling large datasets efficiently. It outputs a refined dataset of personal information, which is then used by other modules in the BIA system for further analysis, such as identity deduplication and legal evaluation.

Also, the processing subsystem 105 includes an identity deduplication module 130 configured to consolidate multiple references to same individual across diverse datasets upon applying a multi-step deduplication process involving both deterministic and probabilistic matching techniques. The identity deduplication module 130 is also configured to leverage data enrichment from external sources to enhance confidence of identity matching. The identity deduplication module 130 is further configured to compute linking confidence scores, with configurable thresholds to trigger manual review for ambiguous or low-confidence matches upon implementing statistical analysis.

The identity deduplication module 130 within the breach impact analysis (BIA) system 100 is designed to consolidate multiple references to the same individual across diverse datasets that are affected during a data breach. The module 130 employs a multi-step deduplication process that integrates both deterministic and probabilistic matching techniques.

Deterministic matching is utilized to accurately match individuals based on unique identifiers. However, in many real-world scenarios, unique identifiers might not be consistently available or accurate. To address this, the module 130 employs probabilistic matching techniques, which involve statistical analysis to link records with similar attributes. This includes leveraging data enrichment sources, such as customer databases or employee records, to enhance the accuracy of identity construction.

The module 130 also includes a probabilistic linking engine, which calculates linking confidence scores for each potential match. These scores are derived from the analysis of various non-unique personal information elements (e.g., names, dates of birth, addresses), considering factors such as data consistency and frequency of occurrence. When the confidence score falls below a predefined threshold, the system automatically flags these cases for manual review. This ensures a balance between automation efficiency and accuracy, allowing human intervention when necessary.

Further enhancing the deduplication process is the module's 130 ability to incorporate a feedback loop mechanism. This mechanism continuously refines the matching process by integrating user feedback and historical breach analysis data, ensuring that the system 100 learns from past decisions and improves over time.

The module 130 also supports the computation of linking confidence scores based on the enriched data and probabilistic analysis, which triggers manual review for ambiguous or low-confidence matches. This mechanism allows the system 100 to optimize the accuracy-efficiency trade-off by automating where possible but involving manual effort when necessary.

Additionally, the identity deduplication module 130 is designed to handle complex data scenarios where an individual might appear in different formats or variations across datasets. It employs graph-based techniques to map relationships between data points, such as connecting an individual's home address in one dataset with a work address in another. This advanced relationship mapping ensures that identities are accurately consolidated, even when the data is incomplete or inconsistent.

The output of this module 130 is a set of unique, consolidated identities, each linked to the relevant personal information detected in the breach. This deduplicated identity set is critical for the subsequent analysis and response processes within the BIA system, as it directly influences the identification of applicable legal obligations, the estimation of potential fines, and the generation of personalized notifications to impacted individuals.

By incorporating advanced deduplication techniques, enriched data sources, and a probabilistic matching engine, the identity deduplication module 130 plays a pivotal role in ensuring that the BIA system delivers accurate, efficient, and legally compliant breach response strategies.

The processing subsystem 105 includes a residency inference module 140 configured to infer explicit, implicit, and potential residency information for identified individuals upon employing machine learning technique and heuristic rules. The residency inference module 140 is also configured to analyse both impacted and enrichment data sources to determine geographical jurisdictions associated with the individuals. The residency inference module 140 is further configured to generate probabilistic residency estimations that account for data uncertainties and possible discrepancies in the residency information.

The residency inference module 140 is a critical component of the breach impact analysis (BIA) system 100, designed to determine the residency of individuals affected by data breaches. This residency inference module 140 employs advanced data integration, machine learning techniques, and probabilistic methods to infer residency with high accuracy.

The residency inference module 140 first collects data from both impacted sources, such as breached personal records, and enrichment sources, such as customer or employee databases. This integrated data is used to enhance the precision of residency inferences. Explicit residency information, like addresses listed in the data, is directly analysed. The module 140 applies machine learning techniques to process this data, utilizing both explicit and implicit information to infer residency.

In cases where data is incomplete or ambiguous, the module 140 generates probabilistic residency estimates. It calculates confidence scores to reflect the reliability of each inferred residency, managing data uncertainties by cross-referencing multiple sources and resolving discrepancies. The module 140 employs heuristic rules to refine these inferences, using domain-specific knowledge and patterns to improve accuracy.

The inferred residency information is then utilized by an analysis module to identify relevant laws and estimate potential fines associated with the breach. This helps in determining legal obligations based on jurisdictional requirements. Additionally, the module 140 integrates feedback mechanisms to continuously update its machine learning models, ensuring that the residency inferences remain accurate and relevant as data patterns and regulatory environments evolve.

Overall, the residency inference module 140 ensures precise determination of an individual's residency, facilitating effective legal compliance and breach response within the BIA system 100.

In addition, the processing subsystem 105 further includes the analysis module 150 configured to evaluate the number of impacted individuals, their residency information, the types of breached data, and the operating locations of the organization to identify applicable legal obligations and regulations. The analysis module 150 is also configured to identity deduplication, and residency inference to calculate the likelihood of relevance for each applicable law upon performing a multi-dimensional analysis incorporating uncertainties in data detection. The analysis module 150 is further configured to estimate potential fines associated with the breach event by simulating various scenarios, considering statutory penalties, and applying probabilistic models to account for uncertainties in the data.

The analysis module 150 of the breach impact analysis (BIA) system 100 plays a crucial role in assessing the legal and financial implications of data breaches. The analysis module 150 processes data from the identity deduplication 130 and residency inference modules 140 to evaluate the number of impacted individuals, their residencies, the types of exposed personal data, and the organization's operational locations.

The module 150 identifies applicable laws by mapping breach details to a global database of privacy regulations. It calculates the relevance of each law, considering data uncertainties and probabilistic models. This helps determine the legal requirements and regulatory obligations related to the breach.

To estimate potential fines, the analysis module 150 simulates scenarios based on identified legal obligations, using probabilistic calculations to provide a range or estimate of fines. It also includes a comparative legal analysis sub-module that evaluates fines and obligations across jurisdictions, offering recommendations for optimal compliance and response.

The module 150 generates detailed breach reports for automated response actions, ensuring that the BIA system effectively manages breach incidents and complies with regulatory requirements.

Furthermore, the processing subsystem 105 includes an automation module 160 configured to automate the generation of breach notification messages for governmental authorities and regulatory agencies, ensuring compliance with jurisdiction-specific requirements. The automation module 160 is also configured to automate the generation of breach notification messages for governmental authorities and regulatory agencies, ensuring compliance with jurisdiction-specific requirements. The automation module 160 is further configured to flag identities or documents for manual review in cases where data ambiguities or low confidence levels are detected upon implementing decision rules.

The automation module 160 of the breach impact analysis (BIA) system 100 streamlines and enhances the response to data breaches by automating critical tasks and communications. It integrates with other system modules to efficiently manage breach incidents and ensure compliance with legal and regulatory requirements.

The automation module 160 is responsible for generating breach notification messages for governmental authorities and regulatory agencies. It utilizes a customizable template library that allows for the creation of tailored notifications based on breach specifics, regulatory requirements, and affected individuals' preferences. This ensures that all notifications are accurate, compliant, and relevant to the incident.

Additionally, the module 160 automates the generation of personalized communication messages for individuals affected by the breach. It employs generative artificial intelligence (AI) techniques or pre-defined templates to craft these messages, incorporating relevant details about the leaked data and instructions for further action. This process ensures that affected individuals receive timely and accurate information about the breach.

The automation module 160 also includes workflow automation features to streamline the breach notification process. It tracks notification deadlines, regulatory response requirements, and compliance obligations, providing real-time monitoring and reporting on the status of automated responses. Alerts and notifications are sent to key stakeholders to keep them informed of the response progress and any issues that arise.

In cases where data ambiguities or low-confidence levels are detected, the module 160 flags identities or documents for manual review. This ensures that ambiguous or uncertain data is appropriately handled by human reviewers, optimizing the accuracy and effectiveness of the breach response.

Overall, the automation module 160 enhances the efficiency and accuracy of breach management by automating communication processes, ensuring regulatory compliance, and providing real-time monitoring and reporting.

The breach impact analysis (BIA) system 100 operates as a comprehensive, automated solution designed to handle and respond to data breaches effectively. The system 100 integrates several modules to manage the entire lifecycle of breach detection, impact assessment, and response, ensuring accuracy and compliance with legal requirements.

Upon detecting a data breach, the system 100 begins with the data collection module 110. This module 110 retrieves impacted data sources from various repositories and breach detection systems 100, including both structured and unstructured data. It also enriches the data by integrating contextual information from customer or employee databases, preparing it for subsequent analysis.

The enriched data is then processed by the data identification module 120. This module 120 scans files to identify personal information linked to individuals using a combination of data loss prevention (DLP) techniques and named entity recognition (NER) techniques. It further enhances detection accuracy by employing generative large language models (LLMs) to filter false positives, resolve ambiguities, and aggregate personal information into coherent references.

Once the personal information is identified, the identity deduplication module 130 consolidates multiple references to the same individual across various datasets. This process involves applying deterministic and probabilistic matching techniques to merge duplicate records. The module 130 leverages additional data enrichment and computes confidence scores to trigger manual review when necessary, ensuring high accuracy in identity consolidation.

Simultaneously, the residency inference module 140 determines the residency of individuals by applying machine learning and heuristic techniques. It analyses data from both impacted and enrichment sources to infer explicit, implicit, and potential residencies. This process includes generating probabilistic residency estimates and validating these inferences with third-party geolocation services.

The analysis module 150 then evaluates the impact of the breach by assessing the number of affected individuals, their residencies, the types of breached data, and the organization's operating locations. It identifies applicable legal obligations and regulations, calculates the likelihood of relevance for each law, and estimates potential fines associated with the breach. This module 150 performs a multi-dimensional analysis, incorporating uncertainties in data detection and deduplication.

Finally, the automation module 160 streamlines the response to the breach by automating several tasks. It generates breach notification messages for governmental authorities and regulatory agencies using customizable templates, ensuring compliance with jurisdiction-specific requirements. It also creates personalized communication messages for affected individuals, employing AI techniques or templates to include relevant details about the breach. Additionally, the automation module 160 manages workflow automation, tracks notification deadlines, and provides real-time monitoring and reporting on the response process. It flags ambiguous identities or documents for manual review, ensuring that all data is handled accurately.

In summary, the BIA system 100 integrates its modules to provide a thorough and automated approach to breach impact analysis and response, optimizing the management of breach incidents and ensuring compliance with legal and regulatory requirements.

Figure 2:
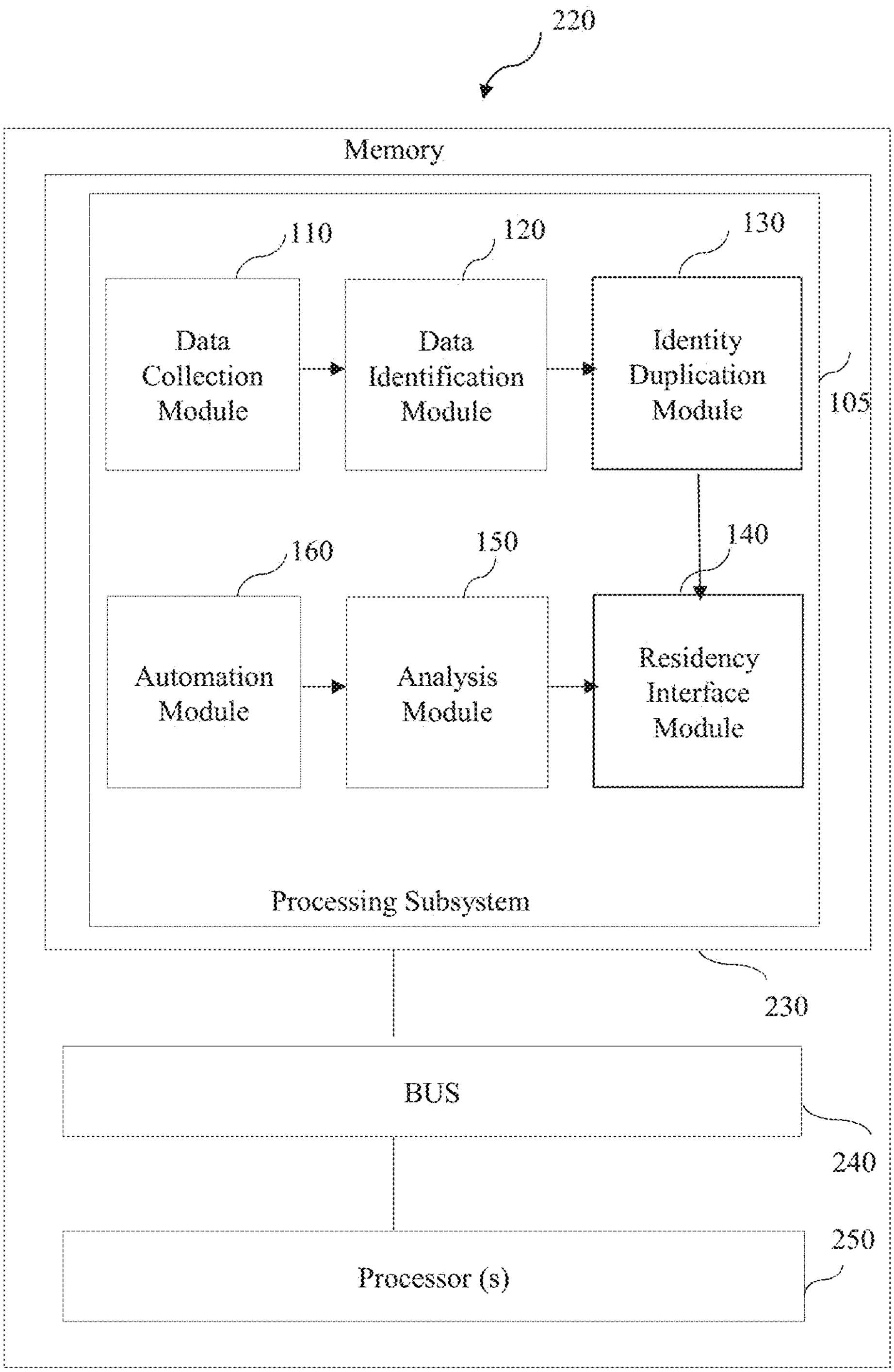
FIG. 2 is a block diagram of a computer or a server in accordance with an embodiment of the present disclosure.

FIG. 2 is a block diagram of a computer or a server in accordance with an embodiment of the present disclosure. The server 220 includes processor(s) 250, and memory 230 operatively coupled to the bus 240. The processor(s) 250, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 230 includes several subsystems stored in the form of executable program which instructs the processor 250 to perform the method steps illustrated in FIG. 1. The memory 230 includes a processing subsystem 105 of FIG. 1. The processing subsystem 105 further has following modules: a data collection module 110, a data identification module 120, an identity deduplication module 130, a residency inference module 140, an analysis module 150 and an automation module 160.

The data collection module 110 retrieve impacted data sources, including structured and unstructured data, upon interfacing with various data repositories and breach detection sub-systems, and to enrich the impacted data with additional contextual information for subsequent analysis upon integrating with customer or employee databases. The data identification module 120 is configured to scan files for personal information linked to individuals using a combination of data loss prevention (DLP) techniques and named entity recognition (NER) techniques, and to enhance detection accuracy by filtering false positives, identifying missed detections, and resolving ambiguities in data classification upon utilizing generative large language models (LLMs). The identity deduplication module 130 is configured to consolidate multiple references to same individual across diverse datasets upon applying a multi-step deduplication process involving both deterministic and probabilistic matching techniques, to leverage data enrichment from external sources to enhance confidence of identity matching, and to compute linking confidence scores, with configurable thresholds to trigger manual review for ambiguous or low-confidence matches upon implementing statistical analysis. The residency inference module 140 is configured to infer explicit, implicit, and potential residency information for identified individuals upon employing machine learning technique and heuristic rules, to analyse both impacted and enrichment data sources to determine geographical jurisdictions associated with the individuals, and to generate probabilistic residency estimations that account for data uncertainties and possible discrepancies in the residency information. The analysis module 150 is configured to evaluate the number of impacted individuals, their residency information, the types of breached data, and the operating locations of the organization to identify applicable legal obligations and regulations, to identity deduplication, and residency inference to calculate the likelihood of relevance for each applicable law upon performing a multi-dimensional analysis incorporating uncertainties in data detection, and to estimate potential fines associated with the breach event by simulating various scenarios, considering statutory penalties, and applying probabilistic models to account for uncertainties in the data, the automation module 160 is configured to automate the generation of breach notification messages for governmental authorities and regulatory agencies, ensuring compliance with jurisdiction-specific requirements, to automate the generation of breach notification messages for governmental authorities and regulatory agencies, ensuring compliance with jurisdiction-specific requirements, and to flag identities or documents for manual review in cases where data ambiguities or low confidence levels are detected upon implementing decision rules.

The bus 240 as used herein refers to be internal memory channels or computer network that is used to connect computer components and transfer data between them. The bus 240 includes a serial bus or a parallel bus, wherein the serial bus transmits data in bit-serial format and the parallel bus transmits data across multiple wires. The bus 240 as used herein, may include but not limited to, a system bus, an internal bus, an external bus, an expansion bus, a frontside bus, a backside bus and the like.

Figure 3:
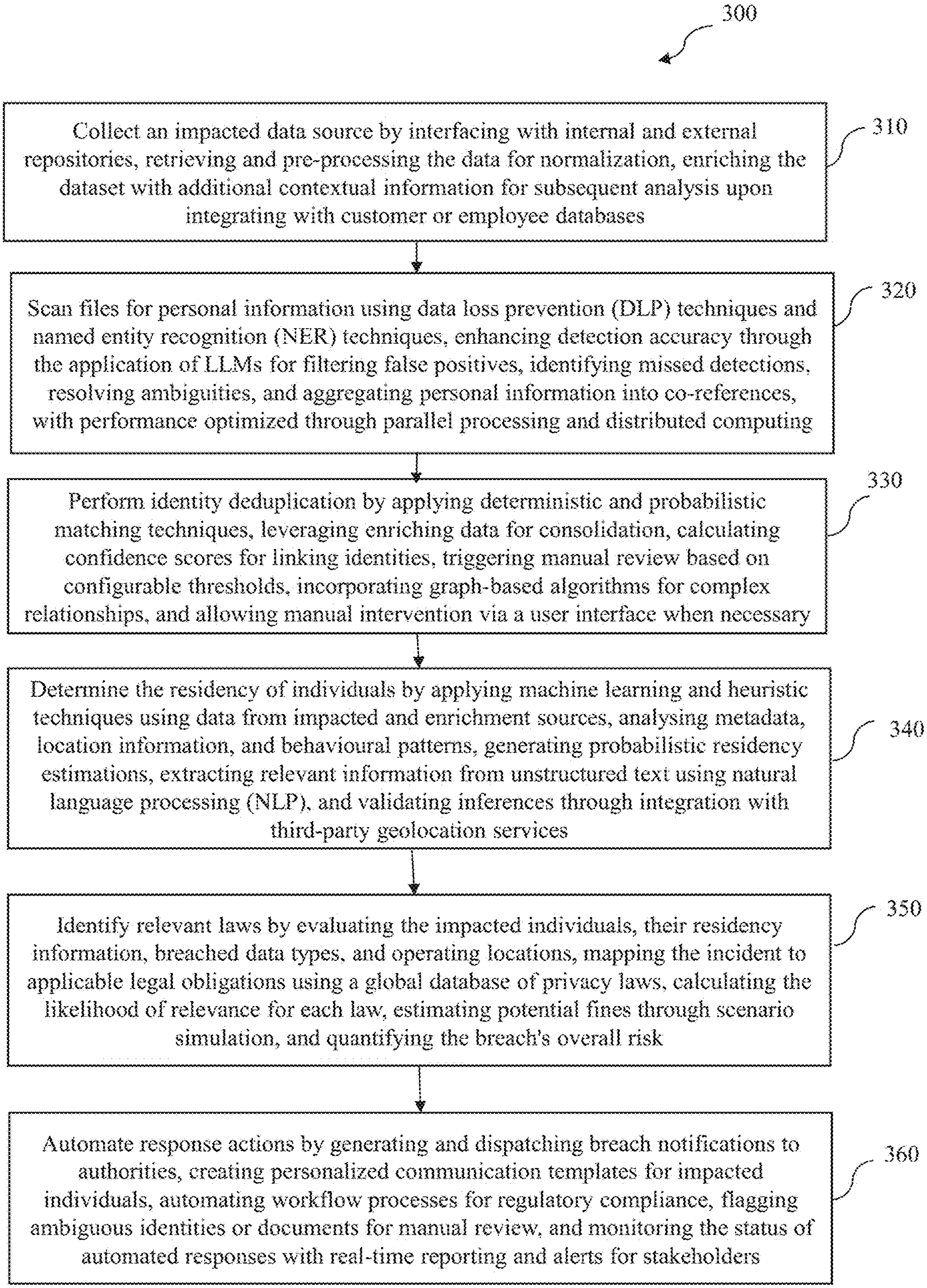
FIG. 3 is a flow chart representing the steps involved in a method for analysing the impact of data breaches on sensitive data of FIG. 1 in accordance with an embodiment of the present disclosure.

FIG. 3 is a flow chart representing the steps involved in a method for analysing the impact of data breaches on sensitive data of FIG. 1 in accordance with an embodiment of the present disclosure. The method 300 includes collecting an impacted data source by interfacing with internal and external repositories, retrieving and pre-processing the data for normalization, enriching the dataset with additional contextual information for subsequent analysis upon integrating with customer or employee databases in step 310. More specifically, the method 300 involves several key steps for processing an impacted data source. Initially, it interfaces with both internal and external repositories to collect the relevant data. This collected data is then retrieved and pre-processed to ensure it is normalized, which includes organizing and formatting it appropriately. Following normalization, the dataset is enriched with additional contextual information, often by integrating data from customer or employee databases. This enrichment provides a more comprehensive view of the data, facilitating more effective analysis and subsequent processing steps in the breach impact analysis process.

The method 300 also includes scanning files for personal information using data loss prevention (DLP) techniques and named entity recognition (NER) techniques, enhancing detection accuracy through the application of LLMs for filtering false positives, identifying missed detections, resolving ambiguities, and aggregating personal information into co-references, with performance optimized through parallel processing and distributed computing in step 320. More specifically, the method 300 involves scanning files for personal information by employing data loss prevention (DLP) techniques and named entity recognition (NER) techniques. To enhance the accuracy of detection, generative large language models (LLMs) are utilized to filter out false positives, identify missed detections, and resolve ambiguities in the data classification process. Additionally, LLMs aggregate personal information into co-references to provide a more accurate identification of individuals. The performance of this scanning and detection process is optimized through the use of parallel processing and distributed computing frameworks, allowing for efficient handling of large datasets and complex data structures. This approach ensures thorough and precise identification of sensitive information in the impacted data sources.

Furthermore, the method 300 performing identity deduplication by applying deterministic and probabilistic matching techniques, leveraging enriching data for consolidation, calculating confidence scores for linking identities, triggering manual review based on configurable thresholds, incorporating graph-based algorithms for complex relationships, and allowing manual intervention via a user interface when necessary, in step 330. More specifically, the method 300 performs identity deduplication by applying both deterministic and probabilistic matching techniques to consolidate references to the same individual across various datasets. It leverages enriching data sources to enhance the accuracy of identity consolidation. The method 300 calculates confidence scores for linking identities, with configurable thresholds that trigger manual review for ambiguous or low-confidence matches. Additionally, graph-based techniques are used to manage complex relationships among data points, and a user interface is provided to facilitate manual intervention when necessary. This approach ensures precise and reliable identity deduplication, accommodating both automated and manual processes to address uncertainties and complex scenarios.

Furthermore, the method 300 determining the residency of individuals by applying machine learning and heuristic techniques using data from impacted and enrichment sources, analysing metadata, location information, and behavioural patterns, generating probabilistic residency estimations, extracting relevant information from unstructured text using natural language processing (NLP), and validating inferences through integration with third-party geolocation services in step 340. More specifically, the method 300 determines the residency of individuals by applying a combination of machine learning and heuristic techniques. It utilizes data from both impacted and enrichment sources, including metadata, location information, and behavioural patterns, to generate probabilistic estimations of residency. The method extracts relevant information from unstructured text using natural language processing (NLP) and integrates these findings with third-party geolocation services to validate and refine residency inferences. This approach ensures accurate determination of individuals' residencies, incorporating multiple data sources and advanced analytical techniques to handle uncertainties and improve the reliability of residency information.

The method 300 also includes identifying relevant laws by evaluating the impacted individuals, their residency information, breached data types, and operating locations, mapping the incident to applicable legal obligations using a global database of privacy laws, calculating the likelihood of relevance for each law, estimating potential fines through scenario simulation, and quantifying the breach's overall risk in step 350. More specifically, the method 300 identifies relevant laws by evaluating the impacted individuals, their residency information, the types of data breached, and the organization's operating locations. It maps the breach incident to applicable legal obligations using a comprehensive global database of privacy laws. By assessing the number of impacted individuals and their residency details, the method calculates the likelihood of relevance for each applicable law. It estimates potential fines through scenario simulation, considering various legal penalties and uncertainties. This approach quantifies the overall risk of the breach, providing a detailed analysis of legal requirements and potential financial implications based on the breach's specifics.

The method 300 further includes automating response actions by generating and dispatching breach notifications to authorities, creating personalized communication templates for impacted individuals, automating workflow processes for regulatory compliance, flagging ambiguous identities or documents for manual review, and monitoring the status of automated responses with real-time reporting and alerts for stakeholders in step 360. The method involves automating response actions related to data breaches. It includes generating and dispatching breach notifications to relevant authorities, ensuring that the notifications meet jurisdiction-specific requirements. Personalized communication templates are created for impacted individuals, incorporating details of the breach and tailored to specific regulatory and individual needs. More specifically, the method 300 automates workflow processes to ensure timely regulatory compliance, tracking notification deadlines and response requirements. It also flags ambiguous identities or documents for manual review when there are uncertainties or low confidence levels. The system provides real-time monitoring and reporting on the status of automated responses, with alerts and notifications sent to stakeholders to keep them informed of progress and issues. This comprehensive approach streamlines breach management, ensuring efficient and compliant communication and response actions.

Various embodiments of the present invention offer several significant advantages in breach impact analysis. By automating the analysis of data breaches, the system enhances efficiency and accuracy in understanding legal obligations and estimating potential fines. It integrates advanced techniques such as data enrichment, identity deduplication, and residency inference, which improve the precision of identifying affected individuals and relevant laws. The use of large language models (LLMs) and machine learning algorithms ensures high detection accuracy, minimizes false positives, and resolves ambiguities in personal data classification. The system's ability to perform probabilistic calculations and simulate scenarios provides a comprehensive estimate of potential fines and legal risks. Additionally, the automation of response actions streamlines the notification process to government agencies and affected individuals, ensuring compliance with regulatory requirements and reducing manual effort. Overall, the invention optimizes breach response strategies, leading to more effective and legally compliant management of data breach incidents.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A computer implemented system to analyse an impact of data breaches on sensitive data, the system comprising:
- a hardware processor; and
- a memory coupled to the hardware processor, wherein the memory comprises a set of program instructions in the form of a processing subsystem, configured to be executed by the hardware processor, wherein the processing subsystem is hosted on a server and is configured to execute on a network to control bidirectional communications among a plurality of modules comprising:
  - a data collection module configured to:
    - retrieve impacted data sources, including structured and unstructured data, upon interfacing with various data repositories and breach detection subsystems; and
    - enrich impacted data with additional contextual information for subsequent analysis upon integrating with customer or employee databases;
  - a data identification module configured to:
    - scan files for personal information linked to individuals using a combination of data loss prevention (DLP) techniques and named entity recognition (NER) techniques; and
    - enhance detection accuracy by filtering false positives, identifying missed detections, and resolving ambiguities in data classification upon utilizing generative large language models (LLMs);
  - an identity deduplication module configured to:
    - consolidate multiple references to a same individual across diverse datasets upon applying a multi-step deduplication process involving both deterministic and probabilistic matching techniques;
    - leverage data enrichment from external sources to enhance confidence of identity matching; and
    - compute linking confidence scores, with configurable thresholds to trigger manual review for ambiguous or low-confidence matches upon implementing statistical analysis;
  - a residency inference module configured to:
    - infer explicit, implicit, and potential residency information for identified individuals upon employing machine learning techniques and heuristic rules;
    - analyse both impacted and enrichment data sources to determine geographical jurisdictions associated with the identified individuals; and
    - generate probabilistic residency estimations that account for data uncertainties and possible discrepancies in the explicit, implicit, and potential residency information;
  - an analysis module configured to:
    - evaluate a number of impacted individuals, their residency information, types of breached data, and operating locations of an organization to identify applicable legal obligations and regulations;
    - apply identity deduplication and residency inference to calculate a likelihood of relevance for each applicable law upon performing a multi-dimensional analysis incorporating uncertainties in data detection; and
    - estimate potential fines associated with a breach event by simulating various scenarios, considering statutory penalties, and applying probabilistic models to account for uncertainties in the data;
  - an automation module configured to:
    - automate generation of breach notification messages for governmental authorities and regulatory agencies, ensuring compliance with jurisdiction-specific requirements; and
    - flag identities or documents for manual review in cases where data ambiguities or low confidence levels are detected upon implementing decision rules.

2. The system of claim 1, wherein the data collection module supports real-time data ingestion and preprocessing, ensuring the impacted data is structured and enriched for subsequent analysis by the system.

3. The system of claim 1, wherein the data identification module is configured to execute parallel processing of data files using distributed computing frameworks and employ context-aware models trained on domain-specific data.

4. The system of claim 1, wherein the identity deduplication module comprises a feedback loop mechanism that continuously refines the matching process by incorporating user feedback and historical breach analysis data.

5. The system of claim 1, wherein the analysis module comprises a sub-module for risk assessment and is configured to provide a quantitative measure of the breach's impact based on the combined evaluation of legal obligations, fines estimation, and residency uncertainties.

6. The system of claim 1, wherein the data collection module is configured to integrate with cloud-based storage systems, allowing for retrieval and processing of data stored in distributed environments, ensuring compliance with data sovereignty regulations through region-specific data handling protocols.

7. The system of claim 1, wherein the data identification module comprises a machine learning-based model training component configured to continuously update and refine the DLP and NER techniques based on new data breach patterns and evolving data types.

8. The system of claim 1, wherein the analysis module comprises a comparative legal analysis sub-module configured to compare the identified legal obligations and potential fines across different jurisdictions, providing recommendations on optimal jurisdictions for legal compliance and breach response.

9. The system of claim 1, wherein the automation module is configured to:

implement workflow automation to streamline the breach notification process, including automated tracking of notification deadlines and regulatory response requirements; and provide real-time monitoring and reporting on the status of automated responses, with alerts and notifications for key stakeholders in the organization.

10. The system of claim 1, wherein the automation module comprises a customizable template library configured to generate communication messages, allowing organizations to tailor notifications based on specific breach characteristics, regulatory requirements, and affected individual preferences.

11. A method for analysing an impact of data breaches on sensitive data, comprising:

collecting an impacted data source by interfacing with internal and external repositories, retrieving and preprocessing the data for normalization, enriching a dataset with additional contextual information for subsequent analysis upon integrating with customer or employee databases;

scanning files for personal information using data loss prevention (DLP) techniques and named entity recognition (NER) techniques, enhancing detection accuracy through the application of LLMs for filtering false positives, identifying missed detections, resolving ambiguities, and aggregating personal information into co-references, with performance optimized through parallel processing and distributed computing;

performing identity deduplication by applying deterministic and probabilistic matching techniques, leveraging enriched data for consolidation, calculating confidence scores for linking identities, triggering manual review based on configurable thresholds, incorporating graph-based algorithms for complex relationships, and allowing manual intervention via a user interface when necessary;

determining residency of the individuals by applying machine learning and heuristic techniques using data from impacted and enrichment sources, analysing metadata, location information, and behavioural patterns, generating probabilistic residency estimations, extracting relevant information from unstructured text using natural language processing (NLP), and validating inferences through integration with third-party geolocation services;

identifying relevant laws by evaluating impacted individuals, their residency information, breached data types, and operating locations, mapping the incident to applicable legal obligations using a global database of privacy laws, calculating a likelihood of relevance for each law, estimating potential fines through scenario simulation, and quantifying the breach's overall risk; and automating response actions by generating and dispatching breach notifications to authorities, creating personalized communication templates for impacted individuals, automating workflow processes for regulatory compliance, flagging ambiguous identities or documents for manual review, and monitoring the status of automated responses with real-time reporting and alerts for stakeholders.

12. The method of claim 11, wherein collecting the impacted data source comprises real-time data ingestion and preprocessing for normalizing and enriching the data for effective analysis.

13. The method of claim 11, wherein scanning files for personal information comprises scanning using domain-specific Named Entity Recognition (NER) models for improving detection accuracy in specialized industries.

14. The method of claim 11, wherein performing identity deduplication comprises a feedback loop mechanism for continuous refinement of the deduplication process based on user feedback and historical data.

15. The method of claim 11, wherein determining the residency of individuals comprises enhancing residency determinations by integrating third-party geolocation services.

16. The method of claim 11, wherein identifying relevant laws comprises a risk assessment sub-module to quantitatively measure the impact of the breach by considering legal obligations, fine estimations, and residency uncertainties.

17. The method of claim 11, wherein automating response actions comprises real-time monitoring and reporting, with automated alerts for stakeholders regarding the status and progress of the response process.

* * * * *